United States Patent
Nakamura

(10) Patent No.: US 9,937,813 B2
(45) Date of Patent: Apr. 10, 2018

(54) VEHICLE

(71) Applicant: TOYOTA JIDOSHA KABUSHIKI KAISHA, Toyota-shi, Aichi-ken (JP)

(72) Inventor: Kimihito Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 15/148,441

(22) Filed: May 6, 2016

(65) Prior Publication Data

US 2016/0347196 A1  Dec. 1, 2016

(30) Foreign Application Priority Data

May 28, 2015 (JP) .................................. 2015-108666
Oct. 20, 2015 (JP) .................................. 2015-206361

(51) Int. Cl.
| | | |
|---|---|---|
| *B60L 1/00* | (2006.01) | |
| *B60L 11/18* | (2006.01) | |
| *B60L 11/08* | (2006.01) | |
| *B60L 3/00* | (2006.01) | |
| *B60L 3/12* | (2006.01) | |

(Continued)

(52) U.S. Cl.
CPC ......... *B60L 11/1851* (2013.01); *B60L 3/0038* (2013.01); *B60L 3/12* (2013.01); *B60L 11/08* (2013.01); *B60L 11/126* (2013.01); *B60K 6/22* (2013.01); *B60L 2240/545* (2013.01); *B60L 2240/547* (2013.01); *B60L 2240/549* (2013.01); *B60Y 2200/91* (2013.01); *B60Y 2200/92* (2013.01); *B60Y 2306/15* (2013.01); *Y02T 10/6217* (2013.01); *Y02T 10/7005* (2013.01);

(Continued)

(58) Field of Classification Search
CPC ...... B60L 11/1851; B60L 3/0038; B60L 3/12; B60L 11/08; B60L 11/126
See application file for complete search history.

(56) References Cited

U.S. PATENT DOCUMENTS

2008/0125932 A1* 5/2008 Yamabe .................. B60K 6/365
701/31.4
2013/0038342 A1* 2/2013 Nozaki .................. B60L 3/0038
324/750.3

FOREIGN PATENT DOCUMENTS

| JP | 2007-099033 A | 4/2007 |
|---|---|---|
| JP | 2012-063246 A | 3/2012 |

(Continued)

OTHER PUBLICATIONS

Partial Translation dated Sep. 23, 2016 Office Action issued in KR10-2016-0058909.

*Primary Examiner* — Daniel Cavallari
(74) *Attorney, Agent, or Firm* — Oliff PLC

(57) ABSTRACT

A vehicle includes an electronic control unit. The electronic control unit is configured to detect a first current value in a period in which a current path is switched to a non-conductive state by an ignition-off operation. The electronic control unit is configured to detect a second current value in a period that is after an ignition-on operation is performed and before the current path is switched from the non-conductive state to a conductive state in the case where the first current value falls out of a specified reference range. The electronic control unit is configured to diagnose that there is an abnormality of the current sensor when the second current value falls out of the reference range and to diagnose that there is no abnormality of the current sensor when the second current value falls within the reference range.

7 Claims, 7 Drawing Sheets

(51) Int. Cl.
*B60L 11/12* (2006.01)
*B60K 6/22* (2007.10)

(52) U.S. Cl.
CPC .......... *Y02T 10/705* (2013.01); *Y02T 10/7077* (2013.01); *Y10S 903/903* (2013.01)

(56) References Cited

FOREIGN PATENT DOCUMENTS

| | | |
|---|---|---|
| JP | 6135409 B2 * | 5/2017 |
| KR | 10-0220460 B1 | 9/1999 |
| KR | 10-1034088 B1 | 5/2011 |
| KR | 10-1251525 B1 | 4/2013 |

* cited by examiner

VEHICLE

INCORPORATION BY REFERENCE

The disclosure of Japanese Patent Application No. 2015-108666 and 2015-206361 filed on May 28, 2015 and Oct. 20, 2015 including the specification, drawings and abstract is incorporated herein by reference in its entirety.

BACKGROUND

1. Field

The disclosure relates to a vehicle and, in particular, to a technique of diagnosing presence or absence of an abnormality of a current sensor that is mounted in a vehicle.

2. Description of Related Art

In general, a current sensor is connected in series to a current path that connects a battery and a power control unit mounted in an electric vehicle. Charging and discharging of the battery are controlled based on a detection value of this current sensor.

Such an abnormality that the detection value of the current sensor is at least offset by a specified amount possibly occurs. An abnormality diagnosis of whether such an abnormality has occurred can be made based on the detection value (so-called an offset value) of the current sensor that is acquired in a state where a current does not flow through the current path. For example, an abnormality detector for a current sensor disclosed in Japanese Patent Application Publication No. 2007-99033 (JP 2007-99033 A) determines an abnormality of the current sensor based on a detection value of the current sensor in a state where an electric power supply to an electrical load is blocked by a blocking means (specifically, a relay) in the case where an ignition switch is turned off.

There is a high possibility that an abnormality of the current sensor caused by a reason such as deterioration by aging is permanent. Meanwhile, the inventors have paid attention to a fact that a temporal abnormality also possibly occurs to the current sensor.

As an example of the temporal abnormality, a case of condensation on the current sensor is raised. In detail, an amount of water vapor that can be contained in the air is reduced as a temperature is lowered. Accordingly, for example, in the case where an ignition-off operation is performed under such an environment that an atmospheric temperature (more specifically, a peripheral temperature of the current sensor) is low, water droplets are possibly generated on a connector that is provided in a wiring path for transmitting an output signal from the current sensor. Alternatively, there is a case where the water droplets are generated on a processing board for the output signal from the current sensor. In such a case, the offset value of the current sensor indicates an abnormal value due to an increase of a leakage current caused by the water droplets or the like, and it is possibly diagnosed that there is the abnormality of the current sensor.

However, the condensation is possibly eliminated when the atmospheric temperature is raised along with a lapse of time. In such a case, the offset value of the current sensor returns to a normal value. As a result, such a diagnosis result that the abnormality has occurred to the current sensor possibly becomes an error.

Such a phenomenon possibly occurs in a situation as will be described below. For example, the condensation possibly occurs on the current sensor when the atmospheric temperature is low, such as in the early morning. In the case where the ignition-off operation is performed after a short-time travel in this state, a current value is acquired by using the current sensor in a state where the condensation thereon remains, and the current value is stored in a memory. Because the ignition-off operation has already been performed, a diagnosis of whether there is the abnormality of the current sensor is not made at this time point. Thereafter, for example, in the case where an ignition-on operation is performed after the atmospheric temperature is raised in the daytime, there is a possibility that the condensation on the current sensor has already been eliminated. In the case where the current value that is acquired in the early morning is read from the memory and an abnormality diagnosis is made based on the value in this state, it is possibly diagnosed that there is the abnormality of the current sensor.

SUMMARY

The disclosure provides a vehicle capable of improving diagnosis accuracy of an abnormality diagnosis of whether there is an abnormality of a current sensor connected in series to a current path that connects a battery and a power control unit.

A vehicle according to one aspect of the disclosure is able to be driven by a user and includes an electric power storage device, a power control unit, a switching device, a current sensor, and an electronic control unit. The power control unit generates drive power by using electric power from the electric power storage device. The switching device is electrically connected to a current path that connects the electric power storage device and the power control unit and is configured to be able to switch the current path between a conductive state and a non-conductive state. The current sensor is connected to the current path in series with the switching device and detects a current that flows through the current path. The electronic control unit diagnoses whether there is an abnormality of the current sensor based on a current value that is detected by the current sensor. The electronic control unit detects a first current value by the current sensor in a period in which the current path is switched to the non-conductive state by an ignition-off operation. The electronic control unit detects a second current value by the current sensor in a period that is after an ignition-on operation is performed and that is before the current path is switched from the non-conductive state to the conductive state in the case where the first current value falls out of a specified reference range. The electronic control unit diagnoses that there is the abnormality of the current sensor when the second current value falls out of the reference range and diagnoses that there is no abnormality of the current sensor when the second current value falls within the reference range.

According to the above vehicle, it is possible to improve diagnosis accuracy of an abnormality diagnosis of whether there is the abnormality of the current sensor connected in series to the current path that connects the electric power storage device and the power control unit.

A vehicle according to another aspect of the disclosure is able to be driven by a user and includes a power control unit, a switching device, a current sensor, and a notification unit. The power control unit generates drive power by using electric power from an electric power storage device. The switching device is electrically connected to a current path that connects the electric power storage device and the power control unit and is configured to be able to switch the current path between a conductive state and a non-conductive state. The current sensor is connected to the current path in series with the switching device and detects a current that flows through the current path. The notification unit notifies a user of an abnormality of the current sensor in the case where there is the abnormality of the current sensor. The notification unit notifies the user of the abnormality of the current sensor in the cases where a first current value detected by the current sensor falls out of a specified reference range in a period in which the current path is switched to the non-conductive state by an ignition-off operation and where a second current value detected by the current sensor falls out of the reference range in a period that is after an ignition-on operation is performed and that is before the current path is switched from the non-conductive state to the conductive state. Meanwhile, the notification unit does not notify the user of the abnormality of the current sensor in the case where the second current value falls within the reference range.

According to the above configuration, it is diagnosed whether there is the abnormality of the current sensor based on the first and second current values. It is often a case where a certain length of a period elapses between acquisition time of the first current value and acquisition time of the second current value. Accordingly, in the case where the first current value falls out of the reference range due to a temporal abnormality, a cause of the abnormality is possibly eliminated with a lapse of the above period. As a result, the second current value falls within the reference range, and it is possibly diagnosed that there is no abnormality of the current sensor. In this way, it is possible to reduce such a possibility that it is diagnosed that there is the abnormality of the current sensor even when the abnormality that requires inspection or repair of the current sensor does not actually occur. Therefore, diagnosis accuracy can be improved.

A vehicle according to another aspect of the disclosure includes an electric power storage device, a power control unit, a switching device, a current sensor and an electronic control unit. The power control unit is configured to generate drive power by using electric power from the electric power storage device. The switching device is electrically connected to a current path that connects the electric power storage device and the power control unit. The switching device is configured to be able to switch the current path between a conductive state and a non-conductive state. The current sensor is connected to the current path in series with the switching device. The current sensor is configured to detect a current that flows through the current path. The electronic control unit is configured to diagnose whether there is an abnormality of the current sensor based on a current value that is detected by the current sensor. The electronic control unit is configured to detect a first current value by the current sensor in a period in which the current path is switched to the non-conductive state by an ignition-off operation. The electronic control unit is configured to detect a second current value by the current sensor in a period that is after an ignition-on operation is performed and before the current path is switched from the non-conductive state to the conductive state. The electronic control unit is configured to; a) diagnose that there is the abnormality of the current sensor in the case where the first current value falls out of a specified reference range and the second current value falls out of the reference range, b) diagnose that there is the abnormality of the current sensor in the case where the first current value falls within the reference range and the second current value falls out of the reference range, c) diagnose that there is no abnormality of the current sensor in the case where the first current value falls out of the reference range and the second current value falls within the reference range, and d) diagnose that there is no abnormality of the current sensor in the case where the first current value falls within the reference range and the second current value falls within the reference range.

According to the above vehicle, it is possible to improve diagnosis accuracy of an abnormality diagnosis of whether there is the abnormality of the current sensor connected in series to the current path that connects the electric power storage device and the power control unit.

The electronic control unit may maintain the current path in the non-conductive state in the case where the first current value falls out of the reference range and the ignition-on operation is performed, and diagnoses whether there is the abnormality of the current sensor based on the second current value in the non-conductive state.

After diagnosing whether there is the abnormality of the current sensor based on the second current value, the electronic control unit may switch the current path to the conductive state and activates the power control unit regardless of whether there is the abnormality of the current sensor.

According to the above configuration, because the period for diagnosing whether there is the abnormality of the current sensor based on the second current value is secured, the diagnosis can further reliably be made. In addition, the vehicle can be brought into a state of being able to travel by activating the power control unit after completion of the diagnosis.

The electronic control unit may acquire each of the first and second current values plural times, determines whether an average value of the first current value that is acquired plural times falls within the reference range, and determines whether an average value of the second current value that is acquired plural times falls within the reference range.

In general, the current value that is detected by the current sensor possibly contains an error. According to the above configuration, an influence of the error can be reduced when the diagnosis is made by using the average value of the current value that is acquired plural times. Therefore, the diagnosis accuracy can further be improved.

The vehicle further may include the notification unit for notifying the user of the abnormality of the current sensor.

According to the above configuration, the user who is notified of the abnormality of the current sensor can bring the vehicle to a dealer or a repair shop, for example, and ask for repair.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
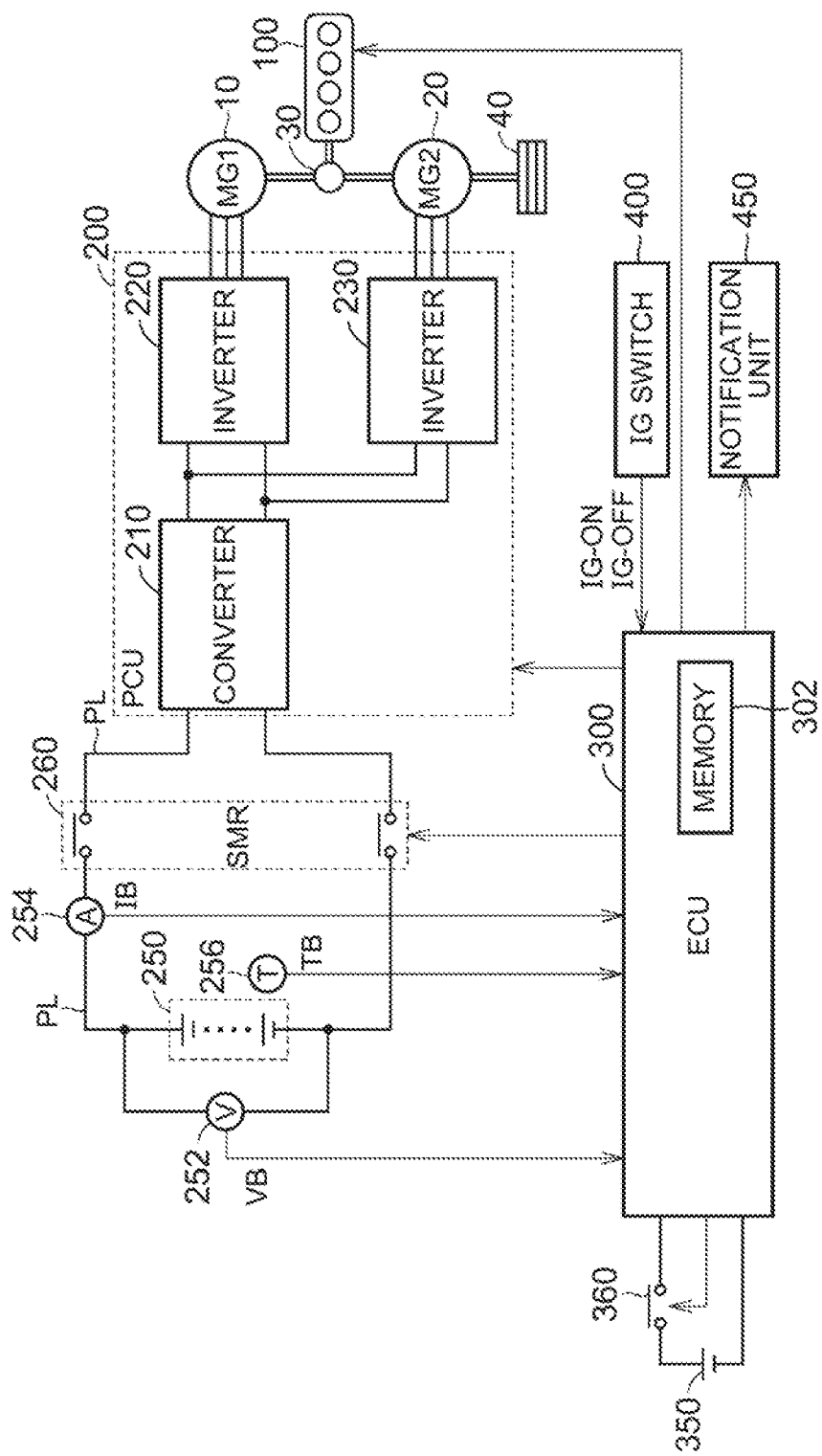
FIG. 1 is a circuit block diagram that schematically shows an overall configuration of a vehicle according to the embodiment.

A detailed description will hereinafter be made on an embodiment of the disclosure with reference to the drawings. Noted that the same or corresponding components in the drawings are denoted by the same reference numerals and symbols and that the description thereon will not be repeated.

In the embodiment, which will be described below, a description will be made by using a configuration of a hybrid vehicle as one example of a vehicle according to the disclosure. However, the vehicle according to the disclosure is not limited to the hybrid vehicle as long as a battery is mounted. Thus, the vehicle according to the disclosure may be an electric vehicle or a fueled vehicle.

FIG. 1 is a circuit block diagram that schematically shows an overall configuration of a vehicle according to this embodiment. With reference to FIG. 1, a vehicle 1 includes a main battery 250, a voltage sensor 252, a current sensor 254, a temperature sensor 256, a system main relay (SMR) 260, a power control unit (PCU) 200, a first motor generator (MG) 10, a second MG 20, a power split mechanism 30, a drive wheel 40, an engine 100, an electronic control unit (ECU) 300, an auxiliary battery 350, a power supply relay 360, an ignition switch 400, and a notification unit 450.

The engine 100 is an internal combustion engine, such as a gasoline engine or a diesel engine. The engine 100 generates drive power for a travel of the vehicle 1 in correspondence with a control signal from the ECU 300.

Each of the first MG 10 and the second MG 20 is a three-phase AC rotary electric machine in which a permanent magnet is embedded in a rotor (both of which are not shown), for example. Both of the first MG 10 and the second MG 20 are driven by the PCU 200.

The first MG 10 is coupled to a crankshaft of the engine 100 via the power split mechanism 30. The first MG 10 rotates the crankshaft of the engine 100 by using electric power of the main battery 250 when the engine 100 is started. In addition, the first MG 10 can generate the electric power by using power of the engine 100. AC power that is generated by the first MG 10 is converted into DC power by the PCU 200 and is stored in the main battery 250. In addition, there is a case where the AC power that is generated by the first MG 10 is supplied to the second MG 20.

The second MG 20 rotates a drive shaft by using at least one of the electric power from the main battery 250 and the electric power generated by the first MG 10. The second MG 20 can also generate the electric power by regenerative braking. The AC power that is generated by the second MG 20 is converted into the DC power by the PCU 200 and is stored in the main battery 250.

The power split mechanism 30 is a power transmission device that mechanically couples three elements that are the crankshaft of the engine 100, a rotary shaft of the first MG 10, and the drive shaft. The power split mechanism 30 makes any one of the above three elements as a reaction element and thereby allows power transmission between the other two elements.

The PCU 200 includes a converter 210 and inverters 220, 230. The converter 210 increases a voltage (a battery voltage) VB that is supplied from the main battery 250 and supplies the increased voltage VB to the inverters 220, 230 during a voltage increasing operation. The converter 210 lowers voltages that are supplied from the inverters 220, 230 for charging the main battery 250 during a voltage lowering operation.

Each of the inverters 220, 230 is configured by including a general three-phase inverter, for example. The inverter 220 controls a current or a voltage of each phase coil of the first MG 10 such that the first MG 10 is operated in accordance with an operation command value at a time when the engine 100 is started, for example. The inverter 230 controls a current or a voltage of each phase coil of the second MG 20 such that the second MG 20 is operated in accordance with an operation command value that is set to generate the requested drive power for the travel of the vehicle during the travel of the vehicle 1.

The SMR 260 is connected in series to a current path PL that connects the main battery 250 and the PCU 200. Closing/opening of the SMR 260 is controlled in accordance with a control signal from the ECU 300. When the SMR 260 is closed, the electric power can be transmitted between the main battery 250 and the PCU 200.

The main battery 250 is an electric power storage device that is configured to be rechargeable. As the main battery 250, for example, a secondary battery, such as a nickel hydrogen battery or a lithium-ion battery, or a capacitor, such as an electric double-layered capacitor, can be adopted.

The voltage sensor 252 detects the battery voltage VB and outputs a signal indicative of a detection result thereof to the ECU 300.

The current sensor 254 is connected to the current path PL in series with the SMR 260. The current sensor 254 detects a current (an input/output current) IB that is input to/output from the main battery 250 and outputs a signal indicative of a detection result thereof to the ECU 300. Noted that a direction of the input/output current IB in which the current flows from the main battery 250 to the PCU 200 (a discharging direction) is set as a positive direction.

The temperature sensor 256 detects a temperature of the main battery 250 (a battery temperature) TB and outputs a signal indicative of a detection result thereof to the ECU 300.

The ECU 300 is configured by including a central processing unit (CPU) (not shown), a memory 302, an input/output buffer, and the like. The ECU 300 controls equipment based on the signal received from each of the sensors as well as a map and a program stored in the memory 302 such that the vehicle 1 is brought into a desired state. More specifically, the ECU 300 controls charging and discharging of the main battery 250 based on the battery voltage VB, the input/output current IB, and the battery temperature TB.

The power supply relay 360 is connected in series between the auxiliary battery 350 and the ECU 300. The auxiliary battery 350 supplies the electric power to the ECU 300 and auxiliary machines, which are not shown, when the power supply relay 360 is closed. Meanwhile, when the power supply relay 360 is opened, a supply of the electric power from the auxiliary battery 350 to the ECU 300 is blocked.

The ignition switch 400 handles an activation operation (an ignition-on operation) of a drive system and a stop operation (an ignition-off operation) of the drive system of the vehicle 1 by a user. Hereinafter, the ignition-on operation will be described as an "IG-ON operation", and the ignition-off operation will be described as an "IG-OFF operation".

When the IG-ON operation is performed, an IG-ON signal is output from the ignition switch 400 to the ECU 300. When receiving the IG-ON signal, the ECU 300 shifts the drive system of the vehicle 1 from a stopped state (a Ready OFF state) to an activated state (a Ready ON state). More specifically, the ECU 300 switches the SMR 260 from an opened state to a closed state. In this way, the electric power can be transmitted between the main battery 250 and the PCU 200. In addition, the ECU 300 controls the vehicle 1 to be in a state where the engine 100, the first MG 10, and the second MG 20 can generate the drive power.

On the other hand, when the IG-OFF operation is performed, an IG-OFF signal is output from the ignition switch 400 to the ECU 300. When receiving the IG-OFF signal, the ECU 300 shifts the vehicle 1 from the Ready ON state to the Ready OFF state. More specifically, the ECU 300 switches the SMR 260 from the closed state to the opened state. In this way, the input/output current IB that flows through the current path PL is blocked. In addition, the ECU 300 controls the vehicle 1 to be in a state where the engine 100, the first MG 10, and the second MG 20 do not generate the drive power.

The ECU 300 has a Ready ON-WAIT flag. When the Ready ON-WAIT flag is turned ON in the Ready OFF state, the ECU 300 keeps the Ready OFF state in an ON period. After the Ready ON-WAIT flag is switched from ON to OFF, the ECU 300 shifts the drive system of the vehicle 1 from the Ready OFF state to the Ready ON state.

When there is an abnormality of the current sensor 254, the notification unit 450 notifies the user thereof. The notification unit 450 is realized by a warning light of the vehicle 1, for example. Noted that an abnormality notification method is not particularly limited, and a display or sound of a car navigation system, which is not shown, may be used, for example.

An abnormality diagnosis of the current sensor will be described. Such an abnormality that a detection value of the current sensor 254 is at least offset by a specified amount (for example, about a few amperes) possibly occurs to the current sensor 254 even in a state where the input/output current IB does not flow through the current path PL. In this case, regardless of whether the input/output current IB flows through the current path PL, an error of the above offset amount (an offset error) always occurs. In order to guarantee that the excess offset error does not occur, it is desired to make the abnormality diagnosis of the current sensor 254. For this reason, an offset value of the current sensor 254 is acquired in a state where the SMR 260 is opened and the input/output current IB does not flow through the current path PL. The diagnosis of whether there is the abnormality of the current sensor 254 is made based on this offset value.

Figure 2:
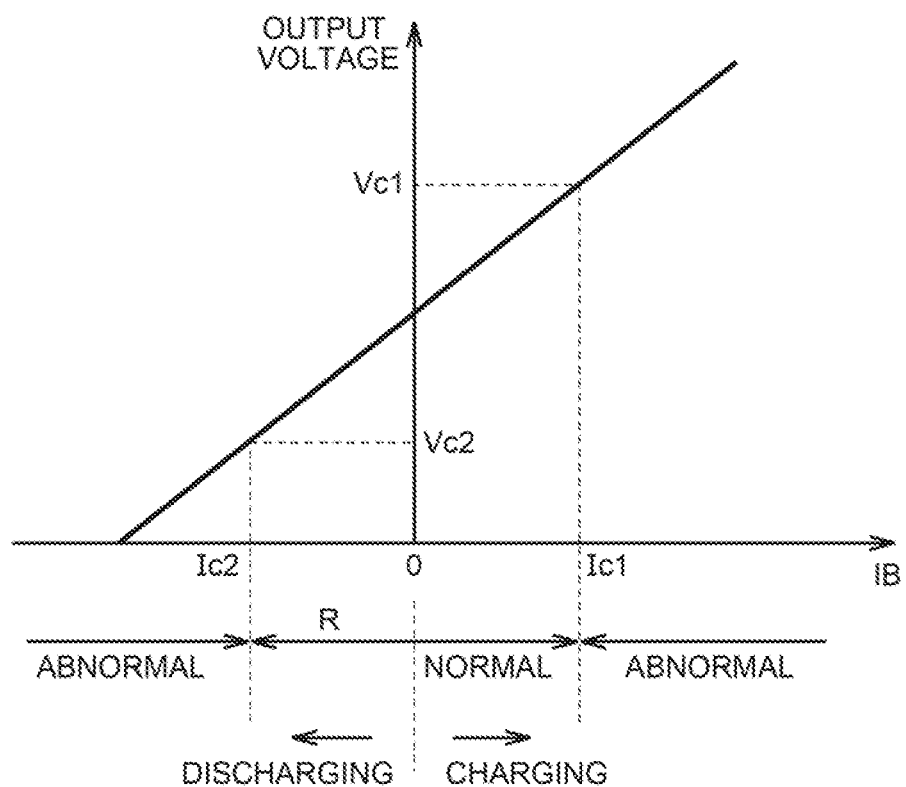
FIG. 2 is a chart for explaining an abnormality diagnosis of a current sensor based on an offset value of the current sensor.

FIG. 2 is a chart for explaining the abnormality diagnosis of the current sensor 254 based on the offset value. In FIG. 2, a horizontal axis indicates the input/output current IB. A vertical axis indicates an output voltage of the current sensor 254. In an example shown in FIG. 2, a substantially linear relationship is established between the input/output current IB and the output voltage of the current sensor 254. In this embodiment, a range where the input/output current IB is at least equal to Ic2 and at most equal to Ic1 is defined as a reference range R.

In the case where the output voltage of the current sensor 254 falls within a range where the output voltage of the current sensor 254 is at least equal to Vc2 and at most equal to Vc1 in the opened state of the SMR 260, an offset current falls within the reference range R. In this case, the ECU 300 diagnoses that the current sensor 254 is not abnormal (is normal).

Meanwhile, in the case where the output voltage of the current sensor 254 is lower than Vc2 in the opened state of the SMR 260, the offset current is lower than Ic2. In addition, in the case where the output voltage of the current sensor 254 is higher than Vc1, the offset current is higher than Ic1. In the case where the offset current is out of the reference range R, just as described, the ECU 300 diagnoses that there is the abnormality of the current sensor 254.

In order to clarify a characteristic of the abnormality diagnosis of the current sensor 254 according to this embodiment, an abnormality diagnosis of a current sensor according to a comparative example will be described first. Noted that, because a configuration of a vehicle according to the comparative example is equivalent to the configuration of the vehicle 1, which is shown in FIG. 1, the description thereon will not be repeated.

Figure 3:
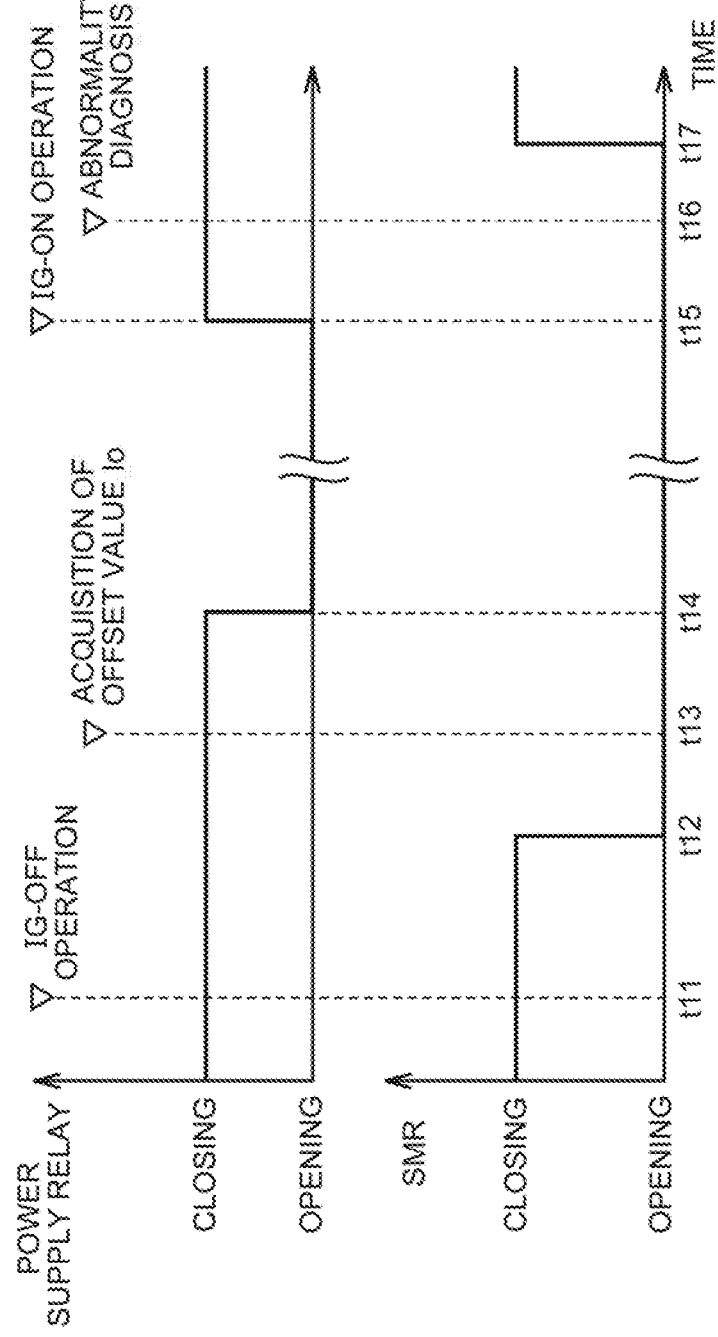
FIG. 3 is a time chart for explaining an abnormality diagnosis of the current sensor according to a comparative example.
Figure 4:
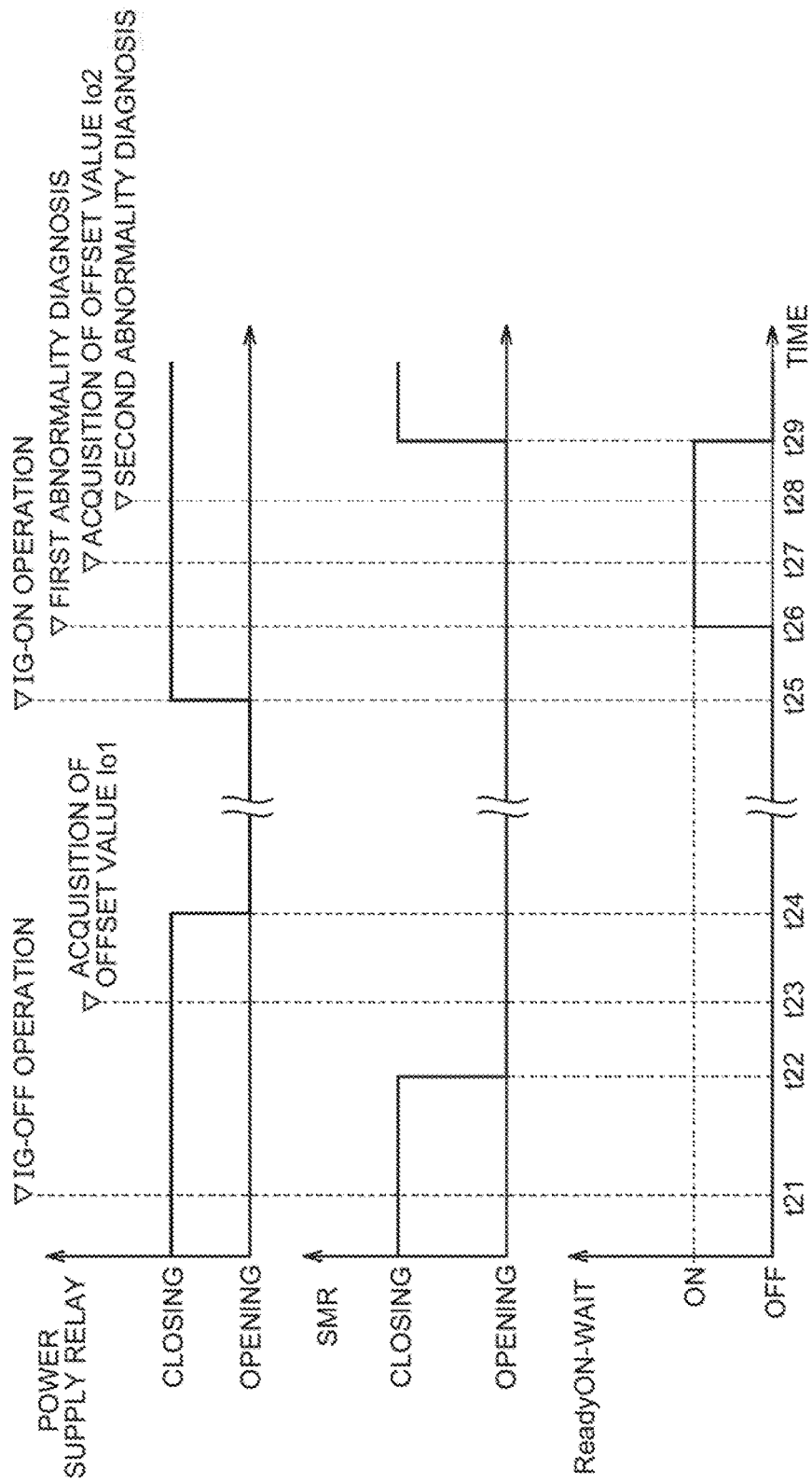
FIG. 4 is a time chart for explaining the abnormality diagnosis of the current sensor according to the embodiment.

FIG. 3 is a time chart for explaining the abnormality diagnosis of the current sensor 254 according to the comparative example. In FIG. 3 and FIG. 4, which will be described below, a horizontal axis indicates an elapsed time. A vertical axis indicates closing/opening of the power supply relay 360 and closing/opening of the SMR 260 (that is, a conductive state/a non-conductive state of the current path PL) from above.

With reference to FIG. 1 and FIG. 3, the vehicle 1 is in the Ready ON state in a period up to time t11. That is, both of the power supply relay 360 and the SMR 260 are closed.

In the case where the IG-OFF operation is performed at the time t11, the SMR 260 is opened after a lapse of a specified period (time t12). Thus, the vehicle 1 is shifted from the Ready ON state to the Ready OFF state.

A current value is acquired by the current sensor 254 at time t13. Because the SMR 260 is opened, the input/output current IB does not flow through the current path PL. Accordingly, the acquired current value corresponds to an offset value Io of the current sensor 254. This offset value Io is stored in the memory 302 (for example, a static random access memory (SRAM)) in a non-volatile manner. Thereafter, the power supply relay 360 is opened, and an electric power supply to the ECU 300 is thereby blocked (time t14).

When the IG-ON operation is performed at time t15, the power supply relay 360 is closed, and the electric power supply to the ECU 300 is resumed. Noted that it is often a case where a certain length of a period (for example, about a few hours to a few days) elapses between the time t14 and the time t15 (that is, between the IG-OFF operation and the IG-ON operation).

At time t16, it is diagnosed whether there is the abnormality of the current sensor 254 based on the offset value Io of the current sensor 254 that is stored in the memory 302. Because this diagnosis method has been described by using FIG. 2, the description thereon will not be repeated herein. If it is diagnosed that there is the abnormality of the current sensor 254, the ECU 300 notifies the user of the abnormality by the notification unit 450. In this way, the user can bring the vehicle 1 to a dealer or a repair shop and ask for inspection of the abnormality and repair of an abnormal part. Thereafter, the SMR 260 is closed at time t17, and the vehicle 1 is shifted from the Ready OFF state to the Ready ON state.

Here, in the case where the abnormality of the current sensor 254 is caused by deterioration by aging, for example, there is a high possibility that such an abnormality is permanent. On the other hand, a temporal abnormality can also occur to the current sensor 254.

As an example of the temporal abnormality, an abnormality caused by condensation on the current sensor 254 is raised. An amount of water vapor that can be contained in the air (a saturation water vapor amount) is reduced as a temperature is lowered. Accordingly, in the case where an atmospheric temperature (more specifically, a peripheral temperature of the current sensor 254) is low, for example, water droplets are possibly generated on a connector (not shown) that is provided in a wiring path for transmitting the output signal from the current sensor 254. Alternatively, there is a case where the water droplets are generated on a processing board (not shown) for the output signal from the current sensor 254. In such a case, the offset value Io of the current sensor 254 indicates an abnormal value due to an increase of a leakage current by the water droplets or the like, and it is possibly diagnosed that there is the abnormality of the current sensor 254. However, there is a case where the condensation is eliminated and the water droplets disappear when the atmospheric temperature is raised along with a lapse of time.

As another example of the temporal abnormality, an abnormality caused by superimposition of electromagnetic noise is raised. Electromagnetic waves emitted from a radio that is mounted in a vehicle such as a taxi are possibly superimposed as a noise on the current path PL. In the case where the current sensor 254 is configured by including a Hall element, an influence of the electromagnetic wave thereon is particularly likely to be significant in principle. When the IG-OFF operation is performed in a period in which the noise is superimposed, the offset value Io possibly indicates the abnormal value. Accordingly, it is possibly diagnosed that there is the abnormality of the current sensor 254. However, when the vehicle as a noise source separates from the vehicle 1, this abnormality is possibly ceased.

Because the abnormality as described above is merely temporal, the offset value of the current sensor 254 possibly returns to a normal value along with the lapse of time. However, such a possibility is not taken into consideration at all in the comparative example. Thus, even in the case where the abnormality that requires the inspection or the repair of the current sensor 254 does not actually occur, it is possibly diagnosed that there is the abnormality of the current sensor 254.

In view of the above, according to this embodiment, a configuration that the offset value is acquired twice by the current sensor 254 is adopted. First, a first offset value Io1 is acquired when the IG-OFF operation is performed. Furthermore, a second offset value Io2 is acquired in a period that is after the IG-ON operation is performed and before the vehicle 1 is shifted to the Ready ON state. In many cases, a certain length of a period (about a few hours to a few days) elapses between acquisition time of the first offset value Io1 and acquisition time of the second offset value Io2. Accordingly, a cause of the above-described temporal abnormality is possibly eliminated. Thus, it is possible to reduce such a possibility that it is diagnosed that there is the abnormality even when the abnormality that requires the inspection or the repair of the current sensor 254 does not occur. As a result, diagnosis accuracy can be improved.

FIG. 4 is a time chart for explaining the abnormality diagnosis of the current sensor 254 according to this embodiment. With reference to FIG. 1 and FIG. 4, because processing up to time t22 is equivalent to corresponding processing in the comparative example (see FIG. 3), the description thereon will not be repeated.

At time t23, the first offset value (a first current value) Io1 of the current sensor 254 is acquired and is stored in the memory 302 in the non-volatile manner. Thereafter, the power supply relay 360 is opened, and the electric power supply to the ECU 300 is thereby blocked (time t24).

When the IG-ON operation is performed at time t25, the power supply relay 360 is closed. Meanwhile, in this embodiment, the Ready ON-WAIT flag is set ON. In this way, the SMR 260 is maintained in the opened state.

At time t26, a first abnormality diagnosis is made based on the offset value Io1 that is stored in the memory 302. This diagnosis method is equivalent to the method described by using FIG. 2. Here, an example, in which it is diagnosed that there is the abnormality of the current sensor 254, will be described.

At time t27, the second offset value (a second current value) Io2 of the current sensor 254 is acquired. Then, a second abnormality diagnosis is made based on the acquired offset value Io2 (time t28). The diagnosis method of the second abnormality diagnosis is also equivalent to the method described by using FIG. 2.

In the time chart shown in FIG. 4, in the case where the offset value Io2 falls within the reference range R in the second abnormality diagnosis, even when the offset value Io1 falls out of the reference range R in the first abnormality diagnosis, a diagnosis result of no abnormality in the second abnormality diagnosis is prioritized. In this way, it is possible to prevent such an erroneous diagnosis that there is the abnormality of the current sensor 254 in the case where the abnormality that occurs during the acquisition of the first offset value Io1 is merely temporal. Therefore, the diagnosis accuracy can be improved.

Figure 5:
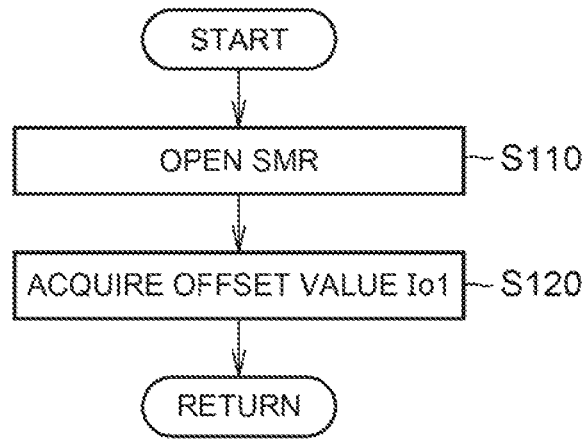
FIG. 5 is a flowchart for explaining the abnormality diagnosis of the current sensor during an IG-OFF operation.

FIG. 5 is a flowchart for explaining the abnormality diagnosis of the current sensor 254 during the IG-OFF operation. This flowchart is invoked from a main routine and executed when the IG-OFF operation is performed. Although each step (hereinafter abbreviated as S) in the flowchart shown in FIG. 5 as well as flowcharts shown in FIG. 6 and FIG. 7, which will be described below, is basically realized by software processing by the ECU 300, it may be realized by hardware (an electronic circuit) that is manufactured in the ECU 300.

With reference to FIG. 1 and FIG. 5, the ECU 300 opens the SMR 260 in S110. In this way, the input/output current IB of the main battery 250 that flows through the current path PL is blocked (see the time t22 in FIG. 4).

In S120, the ECU 300 acquires the first offset value Io1 of the current sensor 254 and stores it in the memory 302 in the non-volatile manner (see the time t23 in FIG. 4). Thereafter, the processing is returned to the main routine.

Figure 6:
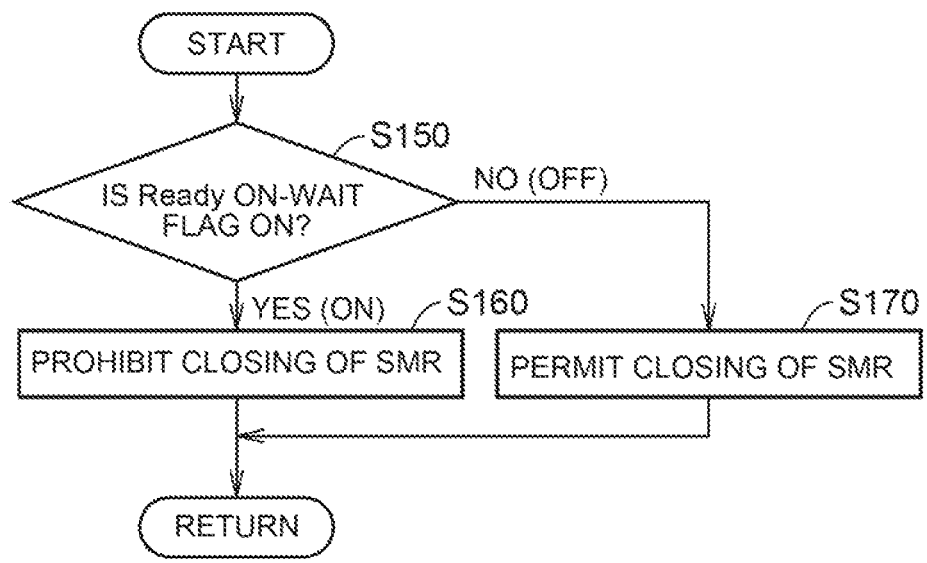
FIG. 6 is a flowchart for explaining control of a system main relay in accordance with ON/OFF of a Ready ON-WAIT flag.

FIG. 6 is a flowchart for explaining control of the SMR 260 in accordance with ON/OFF of the Ready ON-WAIT flag. This flowchart is invoked from the main routine and executed when the IG-ON operation is performed.

With reference to FIG. 1 and FIG. 6, the ECU 300 determines in S150 whether the Ready ON-WAIT flag is ON. If the Ready ON-WAIT flag is ON (YES in S150), the ECU 300 prohibits closing of the SMR 260 (S160). On the other hand, if the Ready ON-WAIT flag is OFF (NO in S150), the ECU 300 permits closing of the SMR 260 (S170).

Figure 7:
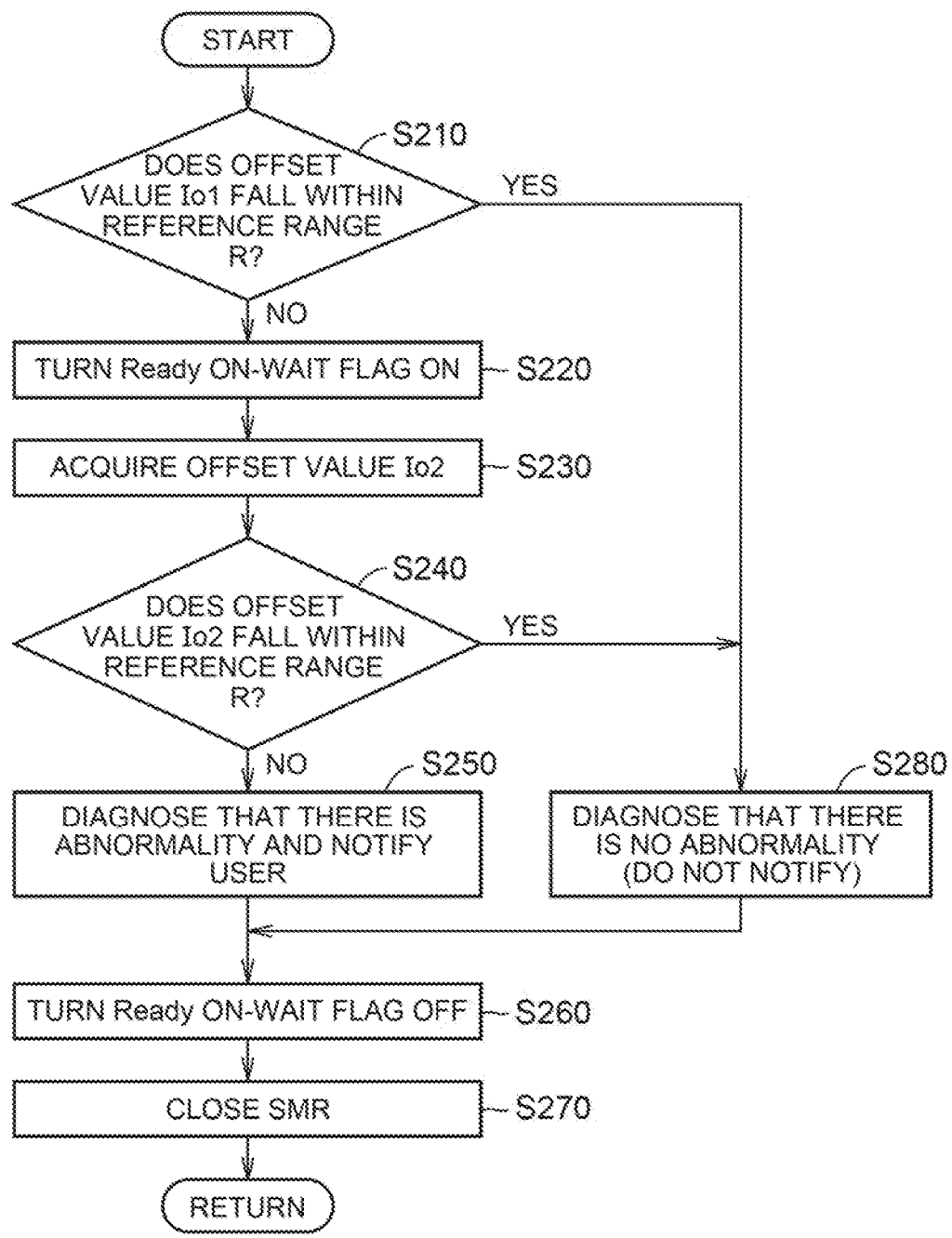
FIG. 7 is a flowchart for explaining the abnormality diagnosis of the current sensor during an IG-ON operation.

FIG. 7 is a flowchart for explaining the abnormality diagnosis of the current sensor 254 during the IG-ON operation. This flowchart is invoked from the main routine and executed when the IG-ON operation is performed.

With reference to FIG. 1 and FIG. 7, the ECU 300 makes the first abnormality diagnosis in S210 (the time t26 in FIG. 4). In detail, the ECU 300 determines whether the offset value Io1 that is stored in the memory 302 in S120 in FIG. 5 falls within the reference range R. If the offset value Io1 falls within the reference range R (YES in S210), the processing proceeds to S280, and the ECU 300 diagnoses that the current sensor 254 is not abnormal (is normal).

On the other hand, if the offset value Io1 falls out of the reference range R (NO in S210), the ECU 300 turns ON the Ready ON-WAIT flag. In this way, a period until closing of the SMR 260 is secured. Accordingly, the second offset value Io2 can be acquired, and the second abnormality diagnosis can be made within the period.

In S230, the ECU 300 acquires the offset value Io2 of the current sensor 254 (see the time t27 in FIG. 4). Furthermore, in S240, the ECU 300 makes the second abnormality diagnosis. That is, the ECU 300 determines whether the offset value Io2 that is acquired in S230 falls within the reference range R (see the time t28 in FIG. 4). If the offset value Io2 falls within the reference range R (YES in S240), the ECU 300 diagnoses that there is no abnormality of the current sensor 254 (S280). In this case, because it is not particularly required to notify the user of the diagnosis result of no abnormality, the notification by the notification unit 450 is not made.

On the other hand, if the offset value Io2 falls out of the reference range R (NO in S240), the ECU 300 diagnoses that there is the abnormality of the current sensor 254 (S250). Furthermore, the ECU 300 controls the notification unit 450 and thereby notifies the user of the abnormality of the current sensor 254.

Thereafter, in S260, the ECU 300 switches the Ready ON-WAIT flag from ON to OFF (see time t29 in FIG. 4). Furthermore, in S270, the ECU 300 closes the SMR 260. In this way, the vehicle 1 can be shifted from the Ready OFF state to the Ready ON state.

As it has been described so far, according to this embodiment, the offset value of the current sensor 254 is acquired in the period in which the current path PL is switched to the non-conductive state by the IG-OFF operation, and is also acquired in the period that is after the IG-ON operation is performed and that is before the current path PL is switched from the non-conductive state to the conductive state. It is often a case where the certain length of the period elapses between the acquisition time of the first offset value Io1 (the time t23 in FIG. 4) and the acquisition time of the second offset value Io2 (the time t27 in FIG. 4). Accordingly, even in the case where the temporal abnormality occurs at the acquisition time of the first offset value Io1, it is diagnosed in the second abnormality diagnosis based on the second offset value Io2 that there is no abnormality when the cause of the abnormality is eliminated due to the lapse of time. In this way, it is possible to reduce such a possibility that it is diagnosed that there is the abnormality of the current sensor 254 even when the abnormality that requires the inspection or the repair of the current sensor 254 does not actually occur. Therefore, the diagnosis accuracy can be improved.

In the time chart shown in FIG. 4, the description has been made with the configuration that presence or absence of the abnormality of the current sensor 254 is diagnosed based on the result of the offset value of the current sensor 254, which is acquired once in each of the first and second abnormality diagnoses as an example. Meanwhile, in general, the current value that is detected by the current sensor possibly contains an error (a variation). Accordingly, in a modified example, a description will be made on a configuration that an influence of the error is reduced by acquiring the offset value of the current sensor 254 plural times.

Figure 8:
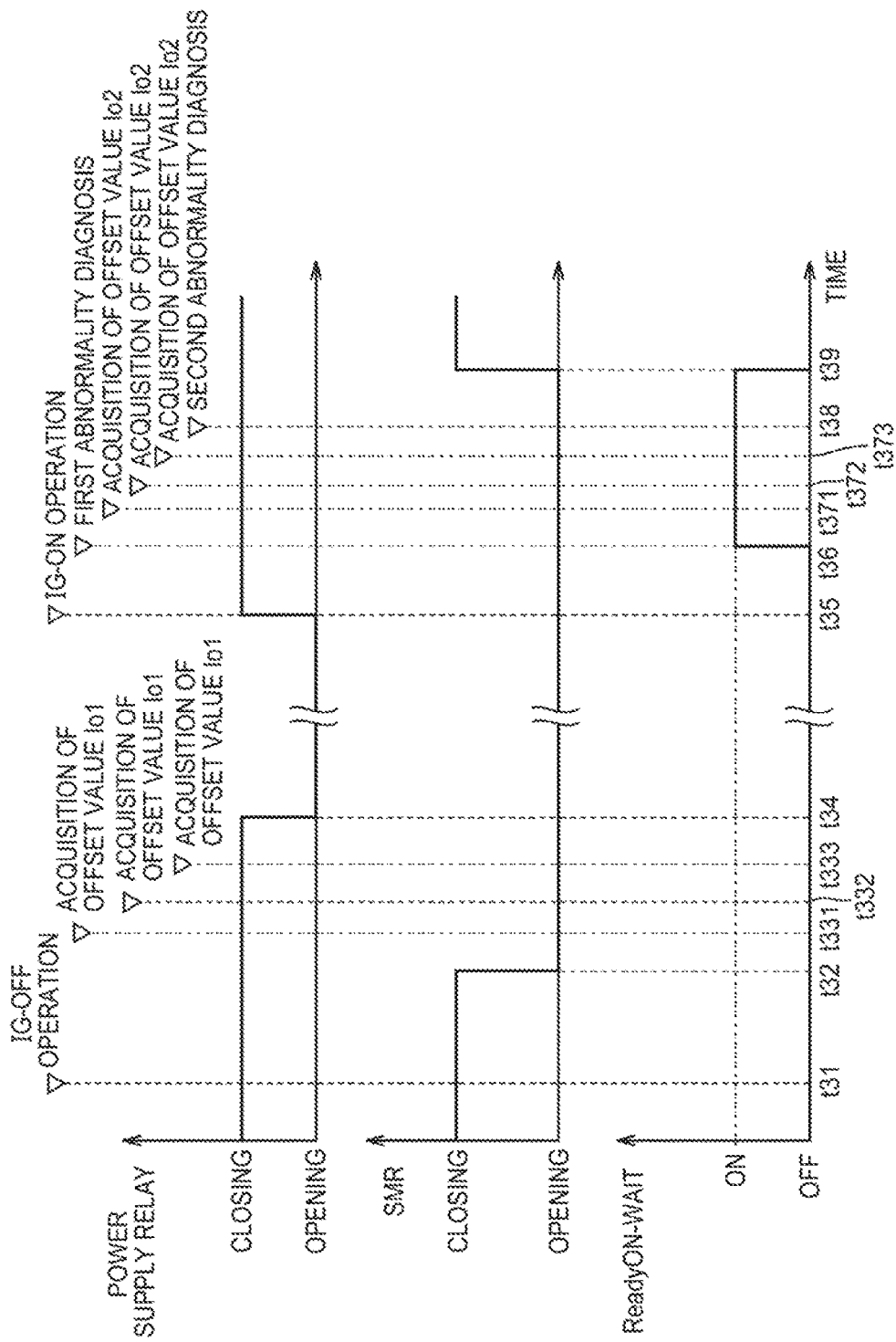
FIG. 8 is a time chart for explaining an abnormality diagnosis of the current sensor according to a modified example 1 of the embodiment.

FIG. 8 is a time chart for explaining the abnormality diagnosis of the current sensor 254 according to a modified example 1 of this embodiment. With reference to FIG. 8, the offset value Io1 of the current sensor 254 is acquired three times in this modified example as indicated by time t331 to t333. Then, the first abnormality diagnosis is made based on an average value of the offset values Io1 that are acquired three times (see time t36). The same applies to the second abnormality diagnosis, and thus the description thereon will not be repeated (see time t371 to t373).

According to the modified example 1, because the abnormality diagnosis is made by using an average value of the offset values that are obtained plural times, the influence of the error can be reduced. Therefore, the diagnosis accuracy can further be improved. Noted that, in this modified example, the number of acquisition of the offset value only needs to be plural times, so it may be twice, four times, or more.

According to the example that has been described in the embodiment, the first abnormality diagnosis is made based on the offset value Io1 that is obtained first. In the case where it is diagnosed in the first abnormality diagnosis that there is the abnormality of the current sensor 254, the second offset value Io2 is acquired. However, the first and second abnormality diagnoses may be made after both of the offset values Io1, Io2 are acquired. In other words, the second offset value Io2 may be obtained regardless of a result of the first abnormality diagnosis.

In this case, regardless of whether the offset value Io1 falls within the reference range R or falls out of the reference range R, it is diagnosed that there is the abnormality of the current sensor 254 when the offset value Io2 falls out of the reference range R. That is, the ECU 300 diagnoses that there is the abnormality of the current sensor 254 in the case where the offset value Io1 falls out of the reference range R and the offset value Io2 falls out of the reference range R. In addition, the ECU 300 diagnoses that there is the abnormality of the current sensor 254 in the case where the offset value Io1 falls within the reference range R but the offset value Io2 falls out of the reference range R.

In addition, regardless of whether the offset value Io1 falls within the reference range R or falls out of the reference range R, it is diagnosed that there is no abnormality of the current sensor 254 when the offset value Io2 falls within the reference range R. That is, the ECU 300 diagnoses that there is no abnormality of the current sensor 254 in the case where the offset value Io1 falls within the reference range R and the offset value Io2 falls within the reference range R. Furthermore, the ECU 300 diagnoses that there is no abnormality of the current sensor 254 in the case where the offset value Io1 falls out of the reference range R but the offset value Io2 falls within the reference range R.

Here, the embodiment will be summarized as follows. The ECU 300 detects the offset value Io1 by the current sensor 254 in the period in which the current path PL is switched to the non-conductive state by the ignition-off operation. In the case where the offset value Io1 falls out of the specified reference range R, the ECU 300 detects the offset value Io2 by the current sensor 254 in the period that is after the ignition-on operation is performed and that is before the current path PL is switched from the non-conductive state to the conductive state. The ECU 300 diagnoses that there is the abnormality of the current sensor 254 when the offset value Io2 falls out of the reference range R. On the other hand, the ECU 300 diagnoses that there is

What is claimed is:

1. A vehicle able to be driven by a user, the vehicle comprising:
an electric power storage device;
a power control unit configured to generate drive power by using electric power from the electric power storage device;
a switching device electrically connected to a current path that connects the electric power storage device and the power control unit, the switching device configured to be able to switch the current path between a conductive state and a non-conductive state;
a current sensor connected to the current path in series with the switching device, the current sensor configured to detect a current that flows through the current path; and
an electronic control unit configured to diagnose whether there is an abnormality of the current sensor based on a current value that is detected by the current sensor, the electronic control unit configured to detect a first current value by the current sensor in a period in which the current path is switched to the non-conductive state by an ignition-off operation, the electronic control unit configured to detect a second current value by the current sensor in a period that is after an ignition-on operation is performed and before the current path is switched from the non-conductive state to the conductive state in the case where the first current value falls out of a specified reference range, and the electronic control unit configured to diagnose that there is an abnormality of the current sensor when the second current value falls out of the reference range and to diagnose that there is no abnormality of the current sensor when the second current value falls within the reference range.

2. The vehicle according to claim 1, wherein
the electronic control unit is configured to maintain the current path in the non-conductive state in the case where the first current value falls out of the reference range and the ignition-on operation is performed, and
the electronic control unit is configured to diagnose whether there is the abnormality of the current sensor based on the second current value in the non-conductive state.

3. The vehicle according to claim 2, wherein
after diagnosing whether there is the abnormality of the current sensor based on the second current value, the electronic control unit is configured to switch the current path to the conductive state and activate the power control unit regardless of whether there is the abnormality of the current sensor.

4. The vehicle according to claim 1, wherein
the electronic control unit is configured to acquire each of the first current values and the second current values plural times, and
the electronic control unit is configured to determine whether an average value of the first current value falls within the reference range and to determine whether an average value of the second current value falls within the reference range.

5. The vehicle according to claim 1 further comprising a notification unit configured to notify the user of the abnormality of the current sensor.

6. A vehicle able to be driven by a user, the vehicle comprising:
an electric power storage device;
a power control unit configured to generate drive power by using electric power from the electric power storage device;
a switching device electrically connected to a current path that connects the electric power storage device and the power control unit, the switching device configured to be able to switch the current path between a conductive state and a non-conductive state;
a current sensor connected to the current path in series with the switching device, the current sensor configured to detect a current that flows through the current path; and
a notification unit configured to notify the user of an abnormality of the current sensor in the case where there is the abnormality of the current sensor, the notification unit configured to notify the user of the abnormality of the current sensor in the case where conditions i), ii) are satisfied, and the notification unit configured not to notify the user of the abnormality of the current sensor in the case where conditions i), iii) are satisfied,
i) a first current value detected by the current sensor falls out of a specified reference range in a period in which the current path is switched to the non-conductive state by an ignition-off operation,
ii) a second current value detected by the current sensor falls out of the reference range in a period that is after an ignition-on operation is performed and that is before the current path is switched from the non-conductive state to the conductive state, and
iii) the second current value detected by the current sensor falls within the reference range in the period that is after the ignition-on operation is performed and that is before the current path is switched from the non-conductive state to the conductive state.

7. A vehicle comprising:
an electric power storage device;
a power control unit configured to generate drive power by using electric power from the electric power storage device;
a switching device electrically connected to a current path that connects the electric power storage device and the power control unit, the switching device configured to be able to switch the current path between a conductive state and a non-conductive state;
a current sensor connected to the current path in series with the switching device, the current sensor configured to detect a current that flows through the current path; and
an electronic control unit configured to diagnose whether there is an abnormality of the current sensor based on a current value that is detected by the current sensor, the electronic control unit configured to detect a first current value by the current sensor in a period in which the current path is switched to the non-conductive state by an ignition-off operation, the electronic control unit configured to detect a second current value by the current sensor in a period that is after an ignition-on operation is performed and before the current path is switched from the non-conductive state to the conductive state, and the electronic control unit configured to;

a) diagnose that there is the abnormality of the current sensor in the case where the first current value falls out of a specified reference range and the second current value falls out of the reference range,
b) diagnose that there is the abnormality of the current sensor in the case where the first current value falls within the reference range and the second current value falls out of the reference range,
c) diagnose that there is no abnormality of the current sensor in the case where the first current value falls out of the reference range and the second current value falls within the reference range, and
d) diagnose that there is no abnormality of the current sensor in the case where the first current value falls within the reference range and the second current value falls within the reference range.

* * * * *